United States Patent [19]

Price

[11] 3,965,583

[45] June 29, 1976

[54] DISPLAY RACK FOR CARPET SAMPLES

[76] Inventor: Raymond C. Price, Rte. 3 Box 392, Golden, Colo. 80401

[22] Filed: May 23, 1975

[21] Appl. No.: 580,237

[52] U.S. Cl. .......................................... 35/55; 211/45
[51] Int. Cl.² .......................................... G09B 25/00
[58] Field of Search .............. 35/50, 55, 56; 206/81; 211/45

[56] References Cited

UNITED STATES PATENTS

| | | | |
|---|---|---|---|
| 1,618,664 | 2/1927 | Kern | 206/81 |
| 2,146,041 | 2/1939 | Wolfson | 35/56 X |
| 2,964,198 | 12/1960 | Eisbart | 211/45 |
| 3,013,959 | 12/1961 | Ventre | 211/45 X |
| 3,195,733 | 7/1965 | Best | 211/45 |
| 3,430,364 | 3/1969 | Kirschbaum | 35/55 X |

*Primary Examiner*—Harland S. Skogquist

[57] ABSTRACT

A carpet sample rack to carry and display rectangular carpet samples. The display can include pattern samples and smaller color samples. The color samples are one-half or one-third as wide as the pattern samples so that two or three color samples will occupy the same space as a pattern sample. The rack is, essentially, a rectangular, open frame having upright sides which are spaced apart to carry a pattern sample. A vertical array of spaced holes is provided in these sides to receive locking snaps which are fitted in corresponding holes at the edges of the pattern samples. Groups of the narrower color samples are secured to transverse straps which span the frame and are snap-locked onto the sides of the frame in the same manner as is the pattern sample. Thus, the samples may be carried upon the frame in a shingled or overlapping arrangement to permit all samples to be viewed simultaneously and the color variation of any one carpet pattern can be easily viewed with the pattern itself.

9 Claims, 12 Drawing Figures

DISPLAY RACK FOR CARPET SAMPLES

This invention relates to frames and racks for displaying samples and more particularly to racks for the display of carpet samples and the like. Accordingly, the invention will be described with respect to its use as a rack for carpet samples, although it is to be recognized that the structure can be used for other purposes.

The conventional mode of assisting a customer to select proper carpeting for his home is to provide various small carpet samples, rectangular pads of carpeting to show the different carpet patterns and the variations of color which are available. In this manner, the customer can review a large selection of carpet patterns and colors and can even take selected samples home to determine how they might fit in with his home decor. Such samples are conventionally carried in binders. A binder is a U-shaped backing which holds the top edges of a number of different carpet samples stacked together. These samples are secured to the binder as by suitable posts or bolts in a book-like arrangement. Such binders may be standardized by providing carpeting samples of given sizes to neatly fit in the binders.

One disadvantage of this practice resides in the fact that the prospective customer can view only one sample or a row of samples at a time. However, it has been found desirable to permit the customer to view not one, but a number of the samples simultaneously. It is especially desirable to provide the view of different color samples along with a given pattern samples. This means that the samples must be removed from the binder, placed on a table or the like and thereafter returned to the binder, all of which is cumbersome and generally too time-consuming for the carpet retailer. Especially when samples are to be taken to the customer's home, the samples are easily lost or mislaid.

The present invention was conceived and developed with the foregoing and other considerations in view and comprises, in essence, a sample display rack for holding and displaying an array of carpet samples in a shingled, overlapping manner so that a customer can look at a large number of samples without having to leaf through a book-like arrangement in a binder. The rack is arranged to utilize samples from a conventional binder, and such samples are mounted upon this rack generally by using the same holes which were punched in the edge of the samples for mounting them in a binder. The width of the rack is thus, essentially the same as the width of the binder and transverse straps are arranged to fit across this rack to carry two or three narrower samples when such is necessary. Suitable snap-on connectors may be used to quickly and easily place and remove samples onto and from the rack.

It follows that an object of the present invention is to provide a novel and improved display rack for carpet samples which permits a customer to simultaneously view a number of carpet samples to simplify his selection of a carpet pattern and color.

Another object of the invention is to provide a novel and improved display rack for carpet samples, or the like, which permits a retailer or dealer to quickly and easily, thereafter, change the display as the need arises.

Another object of the invention is to provide a novel and improved display rack for carpet samples which is easily adapted to be used for various different types of displays may be used where the display is located against a wall, or on the floor in the middle of a room or at a store front.

Other objects of the invention are to provide a novel and improved display rack for carpet samples which is a simple, neat-appearing, light-weight, low-cost, rugged and durable unit.

With the foregoing and other objects in view, my invention comprises certain combinations, constructions, and arrangements of parts and elements as hereinafter described and defined in the appended claims and illustrated in the preferred embodiment in the accompanying drawings in which:

Figure 1:
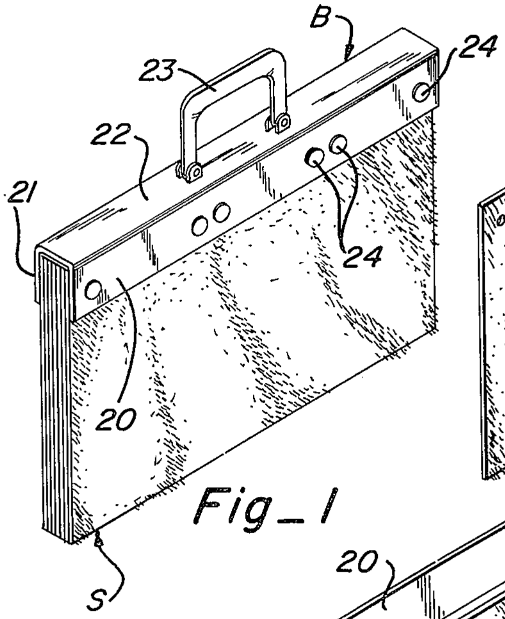
FIG. 1 is an isometric view of carpet samples carried in a conventional binder.

Referring more particularly to the drawing, FIG. 1 illustrates a typical group of rectangular carpet samples 3 carried in a binder B in a conventional manner. The binder B is positioned at the designated top edge of the group of carpet samples. A front face strip 20 of this binder laps the font of the sample group and a rear face strip 21 laps the back side of the sample group. A top edge strip 22 connects to the top edges of the face strips 20 and 21. To complete the binder a handle 23 is provided at the top edge strip 22 of the binder B so that it may be easily carried. Usually, the front face strip 20 of this binder will carry the manufacturer's name of the carpets displayed in the binder. Binder posts 24 extend through the front face strip 20, thence through holes in the samples front thence through the rear strip 21 to secure the samples in the binder. With this arrangement, the samples may be viewed like the pages of a book, one at a time. If a sample is to be removed, the binder posts 24 must be removed first.

Figure 2:
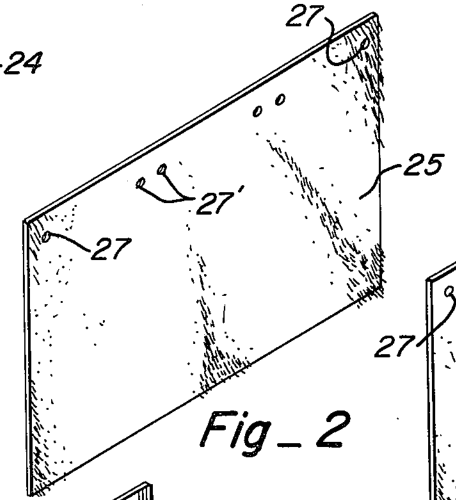
FIG. 2 is an isometric view of one size of a pattern sample carried in the binder.
Figure 3:
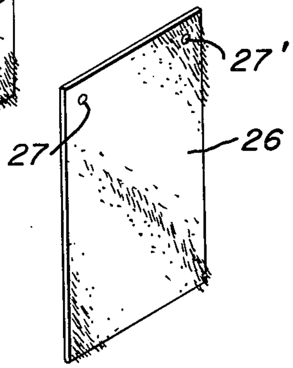
FIG. 3 is an isometric view of a narrower color sample also carried in the binder.

The carpet samples S within the binder are rectangular pads of several sizes. Ordinarily, the largest size of the samples within the binder is established by a pattern sample 25, such as shown at FIG. 2. The pattern sample 25 is large enough to show a major portion of the carpet pattern upon its face. Smaller rectangular color samples 26, such as shown at FIG. 3 may be associated with this pattern sample, and are usually a segment of the larger sample size. To neatly fit in the binder B, along with the pattern samples 25, the height of these color samples may be the same as that of the pattern samples, but the width may be one-half or one-third, or more, of the width of the pattern samples, such that two, three or more color samples may be mounted in the binder, side by side. Additional intermediate binder screws 24 are provided for this purpose, and suitable holes for these binder screws will be provided in all of the samples and in the front and rear face strips 20 and 21. While several basic sizes of samples are available, one convenient and commonly used size for a pattern sample is 27 inches wide by 18 inches high. This permits the use of two color samples 13½-inches wide by 18-inches high or three color samples 9-inches wide by 18-inches high to be used with the pattern sample. With three color samples, a binder will have in the binder three different sets of binder screws 23 and 23' to hold all of the samples in the binder since at least two screws will be required for each including a binder screw at each corner. Holes 27 and 27' for these several sets of binder screws are provided in the binders and in the several samples as indicated.

Figure 4:
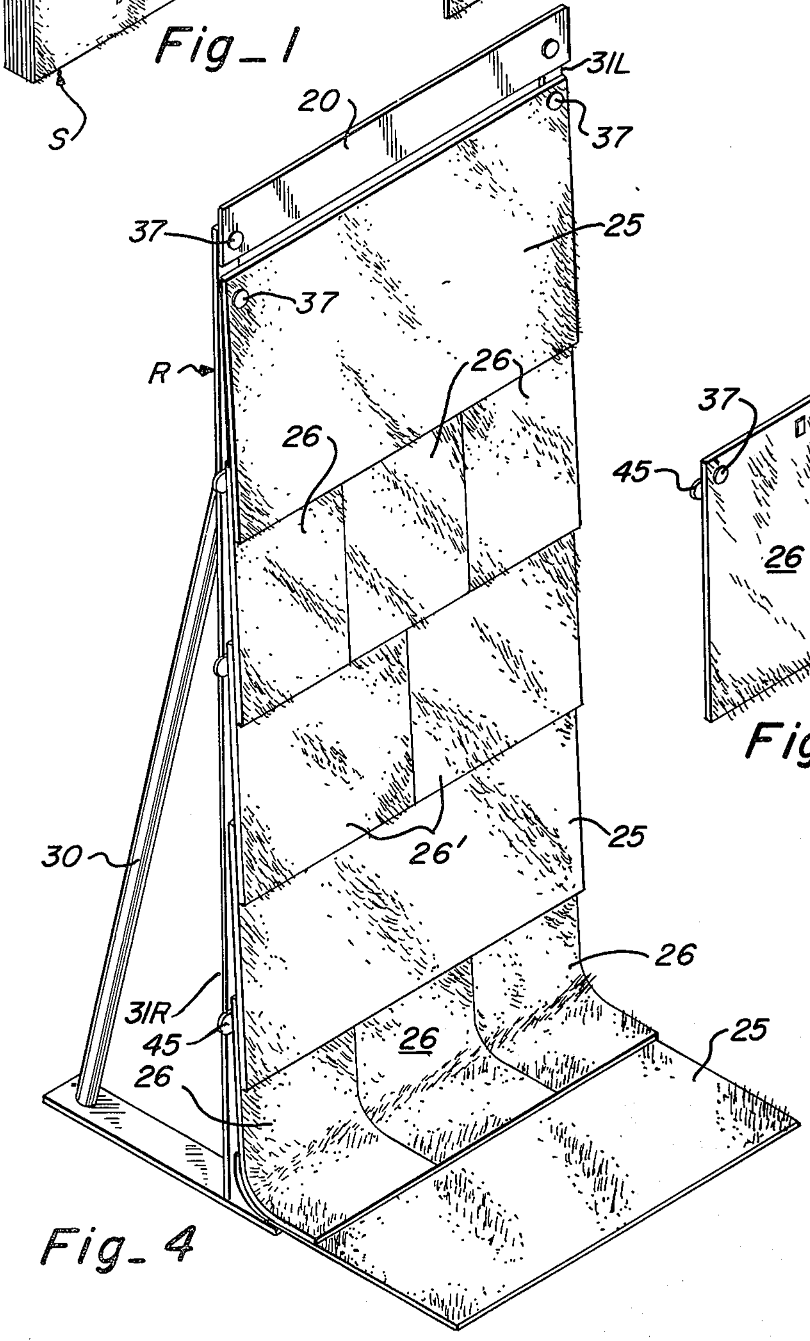
FIG. 4 is an isometric view of a display rack, constructed according to the invention, carrying and displaying carpet samples such as those which may be found in a binder and with the pattern samples and groups of color samples being shingled upon the rack for simultaneous display and being cascaded onto the floor in front of the rack in a pleasing manner for a rug display.

In the present invention, a rack R, arranged as an upright rectangular frame is provided to hold the several carpet samples in a shingled, overlapping, array to exhibit the several pattern samples and color samples simultaneously. The rack is held upright by any suitable support, such as by a strut 30. The several samples 25 and 26 are preferably mounted upon the rack in a lapping shingled array as mentioned to extend downwardly from the top of the rack and to even turn outwardly from the bottom of the rack to be on the floor. This arrangement, as illustrated at FIG. 4 provides a cascade or waterfall pattern of samples. The advantages of this display are obvious. A prospective purchaser can view two or three different carpet patterns, depending upon the size of the samples and the height of the rack, and at the same time, view the different color samples to select a desired color of a selected pattern, may be displayed adjacent to the pattern samples to facilitate the purchaser in selecting a proper color of the sample. Finally, the front face strip 20 of the binder, which ordinarily carries the manufacturer's name and the carpet style designation, can be mounted at the top of this rack to further inform the customer as to the merchandise he is viewing.

In viewing a group of pattern samples and color samples of carpeting in a rack of the type generally shown at FIG. 4, it is often desirable to remove certain samples so that a prospective customer may even take the samples home to facilitate making a selection. Thus, it is important that these samples, both the pattern samples 25 and the color samples 26, may be easily removed from the rack. To accomplish this, all of the samples may be mounted on the rack with easily removable connector pins or clips, as hereinafter described. When two and three color samples are placed side by side to encompass the same, as a pattern sample, they may be extended across this rack by a strap as hereinafter described.

Figure 6:
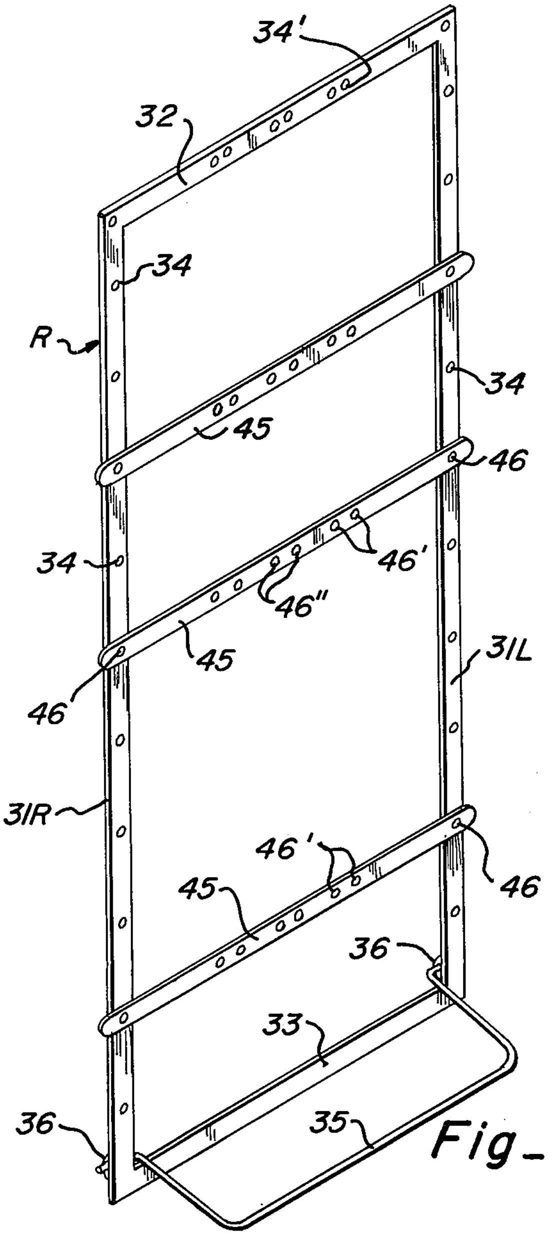
FIG. 6 is an isometric view of a rack such as illustrated at FIG. 4, but with the carpet samples removed to show the rack structure and also the manner in which transverse straps for carrying groups of narrow samples will fit upon the rack.

The rack R illustrated at FIG. 4 is supporting an array of samples 25 and 26 and a binder front forming a header 20. The rack is illustrated at FIG. 6 with the samples and the binder front face removed. Also, at FIG. 6 the support strut 30 is not shown since this rack may be hung, leaning or supported in several different ways. This open frame consists of a pair of peripheral sides 31R and 31L of comparatively thin, lightweight strap metal (strong enough to be self-sustaining) which are held together in spaced parallelism by similar peripheral straps providing a top cross member 32 and a bottom cross member 33. The upright sides 31R and 31L are provided with arrays or pairs of correlated holes 34 which are spaced apart along each side at intervals suitable for several different cascaded arrangements of samples upon the frame. For example, if the samples are to be 18 inches high, a suitable vertical spacing of holes 34 will be at 6 inches. Thus, by the selection of a proper pair of holes in the legs, an entire 18-inch high sample may be exposed. The samples are preferably lapped to expose 12 inches of each sample as illustrated at FIG. 4. However, the samples may also be lapped to expose 6 inches of each sample or the different samples may be completely exposed, two-thirds exposed or one-third exposed in any desired arrangement. The samples near the bottom of the rack may be turned outwardly from the rack to lie upon the floor, as illustrated at FIG. 4, and to smooth this turn, a wire bail 35 may extend outwardly and across the rack near the bottom, as illustrated at FIG. 6. This bail 35 may be hinged to the back side of the rack as in holders 36, so that it may be swung out of the way when not needed.

Figure 8:
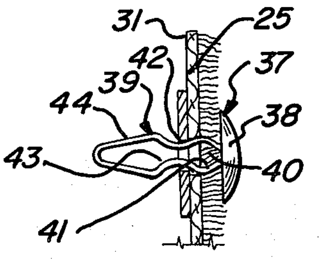
FIG. 8 is a fragmentary sectional view of another type of snap-on connector which may be used to mount a carpet sample upon a transverse strap, as shown at the top of FIG. 5, but on an enlarged scale.
Figure 10:
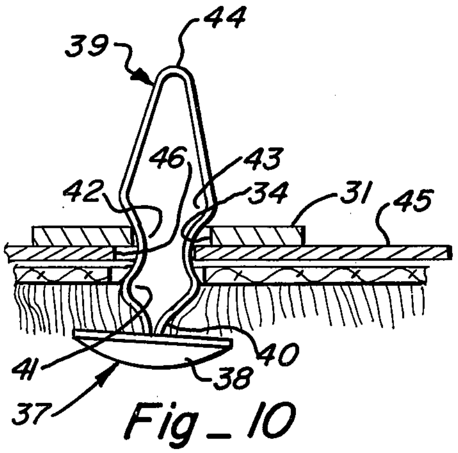
FIG. 10 is a fragmentary sectional view as taken from FIG. 7, but with a snap-on connector such as shown at FIG. 8 holding the strap and a carpet sample upon the rack.

The width of the rack is such that the arrays of holes 34 in the vertical sides 31 are spaced to register with the outer holes 27 in a pattern sample 25. Thus, pattern samples may be mounted directly upon this rack with the use of clip pins, which are extended through each sample and into selected pairs of holes 34 in the sides 31R and 31L. A conventional type of a spring clip 37 as illustrated at FIGS. 8 and 10 may be used for this purpose. This clip 37 is formed with a circular head 38 having a tang 39 projecting therefrom which is formed as a looped spring. This tang spring is undulated to form a neck 40 adjacent to the head, a chest portion 41 adjacent to the neck 40 and a waist portion 42 immediately adjacent to the chest portion. Thence, the tang spring forms a hip portion 43 and tapers from the waist to a rounded tip 44. The spacing between the sides of the tang spring at the hip portions 43 exceeds the diameter of the holes 34 or 27 within which the clip is to be fitted, and thus, this clip must be sprung into position so that it will lock onto the rack R as best illustrated at FIG. 8 to hold a sample 25 in place. Such a clip may be subsequently pulled out of a hole 34 in the rack by forcing the opposing hip portions 43 of the clip to move together.

Figure 5:
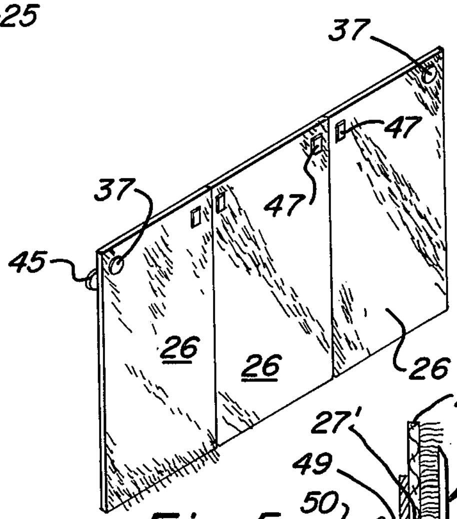
FIG. 5 is an isometric view of three color samples bound together upon a transverse strap for mounting upon the rack as in the manner shown at FIG. 4.

As heretofore mentioned several color samples are mounted in a side by side array upon a strap 45 to be secured to the sides 31 of the rack. These straps 45 are lightweight, metal straps having a length essentially the same as the width of the rack so that each strap 45 may span the gap between the sides 31, and each strap is provided with a pattern of holes 46 and 46' so that three of the color samples may be mounted on the strap, side by side, as illustrated at FIg. 5, and the strap mounted upon the rack R as illustrated at FIG. 6. Also, holes 46'' are provided so that two color samples may be mounted side by side upon a strap as shown at one space at FIG. 4. It is noted that pairs of holes 46, 46' and 46'' will register with holes 27 and 27' in the samples when they are placed upon the rack side by side. It is also to be noted that the outside holes 46 of each strap will carry a spring clip 37 to fit into the outside holes 27 of the group of color samples and also into holes 34 in the rack.

Figure 9:
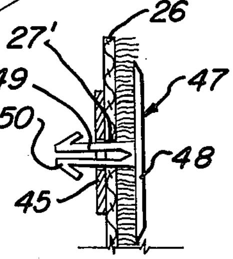
FIG. 9 is a fragmentary sectional view of a further modification of a snap-on connector, also shown at the top of FIG. 5.

A more permanent type of connector clip 47 may be used, to attach the color samples onto the holes 46' or 46'' of the straps. This clip 47 may be formed of a suitable plastic material having an enlarged, square head 48, with a central tang projecting therefrom. This tang may be formed as of two portions as illustrated at FIG. 9, or it may be a single rod-like member. Either way a barb 50 is provided at its end. Being of a resilient plastic material, the clip 47 may be easily snapped into place through a hole 27' in a sample and through a hole 46' or 46'' of a strap 45 and it cannot then be easily removed. Thus, a group of color samples as illustrated at FIG. 5 will remain upon the strap 45 if they are removed from the rack.

Figure 7:
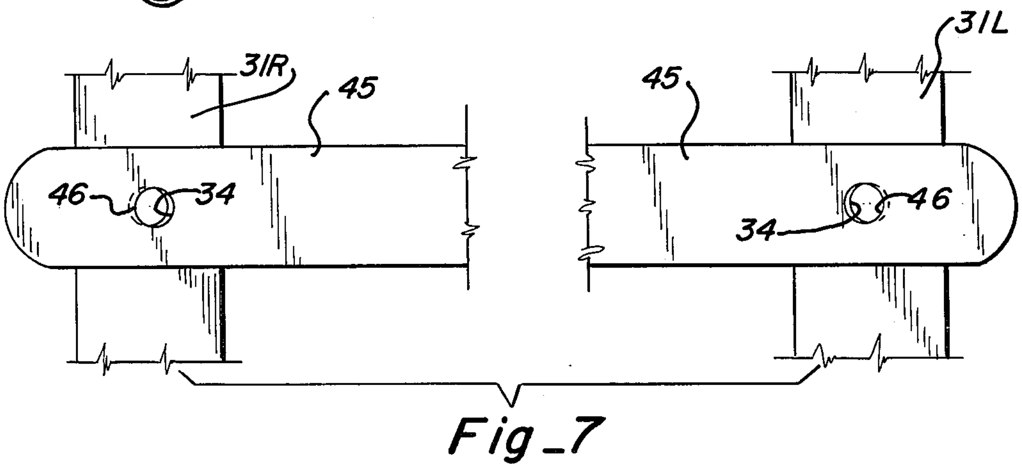
FIG. 7 is an enlarged fragmentary view of a strap placed in position across the rack, such as shown at FIG. 6, but on an enlarged scale, and with the center portion of the strap broken away to conserve space.

As best illustrated at FIG. 7 and it is to be noted that perfect registration of the outer holes 46 of a strap 45 with a pair of holes 34 of the rack legs 31L and 31R does not exist, and it is preferable that the strap holes 46 are spaced slightly closer together to offset the holes 34 of the sides. The purpose of such an offset is illustrated at FIG. 10. This will force a properly placed spring clip 37 holding the corner of a sample, the strap 45 and a leg 31 together to tip slightly so that the waist portion 42 of the clip will grip both a portion of the hole 34 and the hole 46. It was found that where the holes 34 and 46 were perfectly registered, there was a chance for the hole 46 in the strap 45 to squeeze against the chest portion 41 of the tang of the clip 37 and accidentally permit the clip to release the same and strap from the rack.

Figure 11:
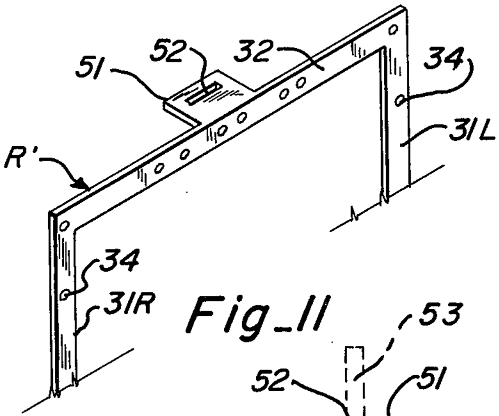
FIG. 11 is an isometric view of a fragmentary portion of a display rack showing a mounting lug at the back side of the rack.
Figure 12:
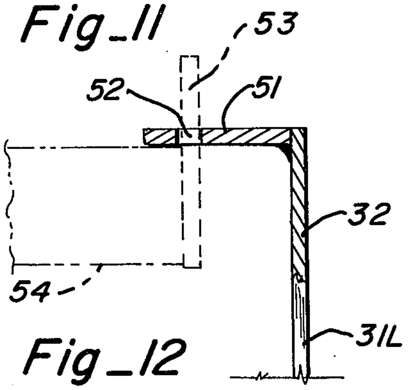
FIG. 12 is a fragmentary sectional detail as taken from at FIG. 11, but on an enlarged scale and with an upright rod holding the lug.

The strut 30 illustrated at FIG. 4 is merely one mode of holding the rack R for display purposes. Another form of a support is illustrated at FIGS. 11 and 12. An ear 51 outstands rearwardly from the rear side of the top cross arm 32 of the rack R and a slotted hole 52 is provided in this ear to receive a support hook, at FIG. 12 in broken lines, a suitable hook may be formed as a short bar 53 fastened to a rack 54 or the like to extend through the slotted hole 52 of the ear to support the rack.

It is to be noted that this entire rack and the appurtenances thereof may be made of lightweight metal because it will not support any significant weight. Thus, the size of the straps may be comparatively small and manufactured at a very moderate cost permitting a store to have easily moved facilities for displaying a large number of carpet samples in a pleasant, effective manner without a large investment.

I have now described my invention in considerable detail. However, it is obvious that others skilled in the art can build and devise alternate and equivalent constructions which are nevertheless within the spirit and scope of my invention. Hence I desire that my protection be limited not by the constructions illustrated and described, but only by the proper scope of the appended claims.

What is claimed is:

1. A carpet sample display rack for releasably supporting a plurality of generally rectangular carpet samples each being at least partially exposed comprising:

a. a generally rectangular, open frame formed set of relatively thin straps lying flatly in the plane of the frame, providing a relatively thin side profile, and including a pair of opposed strap members arranged for uprights and pair of opposed strap members adjacent the ends of the uprights as cross members, and therebeing a plurality of spaced holes through an upright spaced along its length and therebeing a plurality of complementary holes in the opposed upright arranged to be generally horizontal when the rack is mounted upright and each of holes being spaced from adjacent holes a distance less than the height of the samples;

b. a plurality of span straps of a length to span the distance across the opposed uprights and including a plurality of holes therethrough, with a pair of holes adjacent the outer ends of each span strap spaced to generally align with a pair of complimentary holes in the opposed uprights, and including a plurality of holes intermediate said outer holes arranged to coincide with the width of carpet samples held thereon;

c. a plurality of fasteners arranged to pass at least partially through the holes, pairs of which releasably secure each span strap to complimentary holes in said uprights, and pairs of which secure carpet samples to said straps and said span straps; and d. means for supporting said rack in upright position.

2. A carpet sample display rack according to claim 1 wherein said frame is relatively rigid and said span straps are relatively flexible.

3. A carpet sample display rack according to claim 1 wherein the holes adjacent the ends of each span strap are out of register with complimentary holes in said upright straps so as to tip a fastener placed through the holes and securely hold said span straps on said uprights.

4. A carpet sample display rack according to claim 1 being further characterized by the combination of said rack and a plurality of carpet samples secured thereto in a shingled effect to give visability to pattern carpet samples and color samples thereof.

5. A carpet sample display rack according to claim 1 wherein said span straps include a plurality of pairs of holes, including the holes adjacent the ends thereof, to secure a plurality of carpet samples thereto in side-by-side relation.

6. A carpet sample display rack according to claim 1 wherein means for supporting said rack includes angle brace means and base means therefor.

7. A carpet sample display rack according to claim 1 wherein means for supporting said rack includes loop means on said upper cross strap for passing over hook means supporting said rack in upright position.

8. A carpet sample display rack according to claim 1 being further characterized by a releasable extension means mountable on said rack adjacent the bottom thereof and extending generally across the width thereof to support carpet samples at an angle outwardly from the plane of said rack.

9. A carpet sample display rack according to claim 1 wherein said fasteners are of a sufficient length to pass through a carpet sample, a span strap and an upright strap thereof.

* * * * *